United States Patent
Lu et al.

(10) Patent No.: US 8,463,592 B2
(45) Date of Patent: Jun. 11, 2013

(54) MODE SUPPORTING MULTIPLE LANGUAGE INPUT FOR ENTERING TEXT

(75) Inventors: Fang Lu, Westford, MA (US); Lei Wang, Beijing (CN); Wen Hao Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/844,093

(22) Filed: Jul. 27, 2010

(65) Prior Publication Data

US 2012/0029902 A1 Feb. 2, 2012

(51) Int. Cl.
*G06F 17/28* (2006.01)

(52) U.S. Cl.
USPC .......................................................... 704/2

(58) Field of Classification Search
USPC .......................................................... 704/2
See application file for complete search history.

(56) References Cited

U.S. PATENT DOCUMENTS

| | | | | |
|---|---|---|---|---|
| 6,161,082 A * | 12/2000 | Goldberg et al. | | 704/3 |
| 6,182,099 B1 * | 1/2001 | Nakasato | | 715/236 |
| 6,704,700 B1 * | 3/2004 | Uchida et al. | | 704/2 |
| 7,080,002 B1 | 7/2006 | Kim | | |
| 7,107,204 B1 | 9/2006 | Liu et al. | | |
| 7,177,797 B1 * | 2/2007 | Micher et al. | | 704/9 |
| 7,277,029 B2 * | 10/2007 | Thiesson et al. | | 341/22 |
| 7,403,888 B1 * | 7/2008 | Wang et al. | | 704/2 |
| 7,424,675 B2 * | 9/2008 | Lee et al. | | 715/262 |
| 7,562,007 B2 | 7/2009 | Hwang | | |
| 2005/0086214 A1 * | 4/2005 | Seewald et al. | | 707/3 |
| 2005/0187754 A1 * | 8/2005 | Suess | | 704/4 |
| 2006/0206308 A1 * | 9/2006 | Moore | | 704/5 |
| 2007/0271088 A1 * | 11/2007 | Waibel et al. | | 704/9 |
| 2008/0147377 A1 | 6/2008 | Okura et al. | | |
| 2008/0154576 A1 * | 6/2008 | Wu et al. | | 704/2 |
| 2008/0221868 A1 * | 9/2008 | Melnick et al. | | 704/8 |
| 2009/0170536 A1 | 7/2009 | Rang et al. | | |
| 2009/0210214 A1 | 8/2009 | Qian et al. | | |
| 2009/0276206 A1 * | 11/2009 | Fitzpatrick et al. | | 704/2 |
| 2009/0299724 A1 * | 12/2009 | Deng et al. | | 704/2 |
| 2009/0307584 A1 * | 12/2009 | Davidson et al. | | 715/257 |
| 2009/0326912 A1 * | 12/2009 | Ueffing | | 704/2 |
| 2010/0204978 A1 * | 8/2010 | Gao et al. | | 704/2 |

FOREIGN PATENT DOCUMENTS

| | | | |
|---|---|---|---|
| WO | 2008/124769 A1 | 10/2008 | |
| WO | 2008/127937 A1 | 10/2008 | |

OTHER PUBLICATIONS

Gregg Tavares, "Japanese Input on Windows XP"; http://blog.greggman.com/blog/japanese_input_on_windows_xp/; downloaded Jul. 15, 2010.

* cited by examiner

Primary Examiner — Jakieda Jackson
(74) Attorney, Agent, or Firm — Thomas E. Lees, LLC

(57) ABSTRACT

Strings entered into a computer system are converted to a common language. The process of converting strings to a common language comprises determining a user-selected target language, associating a user-selected primary input language with the target language and associating a user-selected secondary input language with the target language. The process further comprises obtaining a string of at least one character, converting the obtained string from the primary input language to the target language if the obtained string corresponds to a valid string in the primary input language and converting the obtained string from the secondary input language to the target language if the obtained string corresponds to a valid string in the secondary input language and is not a valid string in the primary input language.

19 Claims, 7 Drawing Sheets

MODE SUPPORTING MULTIPLE LANGUAGE INPUT FOR ENTERING TEXT

BACKGROUND

Various aspects of the present invention relate generally to the entry of information into a computer system, and more particularly, to the efficient input of information in multiple languages to produce an output in a language that is common to, and different from, the multiple languages used to input the information.

A user entering information into a computer using a typical 104-key United States computer keyboard (keyboard) may need or want to input at least some portion of information using a language or symbols that are not supported by the keyboard. For example, a user may want to enter text in a logographic language, such as Chinese. Unfortunately, the keyboard will not accommodate all the possible characters in the written form of this logographic language. As another example, the user may want to enter text in a language that is not logographic, but where the keyboard does not normally support all of the characters of the written language, such as Russian or Arabic.

To accommodate such a user's needs, an input method editor (IME) can be used, which converts keystrokes into characters and symbols not normally found on the keyboard. Typically, the user must first select a desired language, such as by maneuvering through one or more menus of an operating system, and by selecting a language setting in an appropriate dialog window. The user must then navigate to a software application such as a word processor and enter keystrokes corresponding to the desired output, e.g., by entering the desired characters phonetically in the example of entering text in Chinese. Often times, this process requires the user to enter several strokes on the keyboard to write one character.

Keeping with the above example of Chinese, if a user wants to enter the Chinese character 川, pronounced "chuan", then the user must activate the IME, choose Chinese as the language, and type "chuan" on the keyboard. The IME will then interpret the string representing the phonetic pronunciation "chuan" and allow the operator to import the Chinese character 串 into a word processing document.

BRIEF SUMMARY

According to various aspects of the present invention, systems, methods and computer program products are provided for converting strings to a common language. The process of converting strings to a common language comprises determining a user-selected target language, associating a user-selected primary input language with the target language and associating at least one user-selected secondary input language with the target language. In this manner, the target language is common to, and different from, the primary input language each secondary input language. The process further comprises obtaining a string of at least one character, converting the obtained string from the primary input language to the target language if the obtained string corresponds to a valid string in the primary input language, and converting the obtained string from the secondary input language to the target language if the obtained string corresponds to a valid string in the secondary input language and is not a valid string in the primary input language. The process still further comprises outputting the converted string in the target language.

DETAILED DESCRIPTION

Various aspects of the present invention facilitate the efficient input of information in multiple languages to produce an output in a target language that is common to, and different from, the multiple languages used to input the information. Where the target language comprises a logographic language such as Chinese, a romanization of the logographic language, e.g., pinyin, is considered an input language that is different from the target language, Chinese in this example, because pinyin utilizes combinations of characters from the Latin alphabet, typically modern English characters found on conventional U.S. keyboard layouts, to represent Chinese characters.

According to various aspects of the present invention, a user enters information into a computer using a standard keyboard in such a way that the user is free to type using multiple languages as desired, including the ability to commingle words in different languages, even within the same sentence or context. The entered information is converted to the target language without requiring the user to break the flow of writing, thus avoiding the requirement of pressing specific key sequences/hotkeys to change the input language. Rather, the user enters information in a normal manner, without the need to remember to change any language settings while writing.

According to various aspects of the present invention, the flow or flows to convert the input of information in multiple languages to produce an output in a target language, may be implemented in an application suitable for the entry of text, e.g., into a word processor, such as natively within the word processor, through the implementation of an input method editor (IME) configured to function as described more fully herein, through the use of a client running on top of, or otherwise in cooperation with an IME and/or word processor, etc. Alternatively, various aspects of the present invention may be deployed remotely, e.g., as a web-based application, distributed, e.g., across multiple computers, etc.

Figure 1:
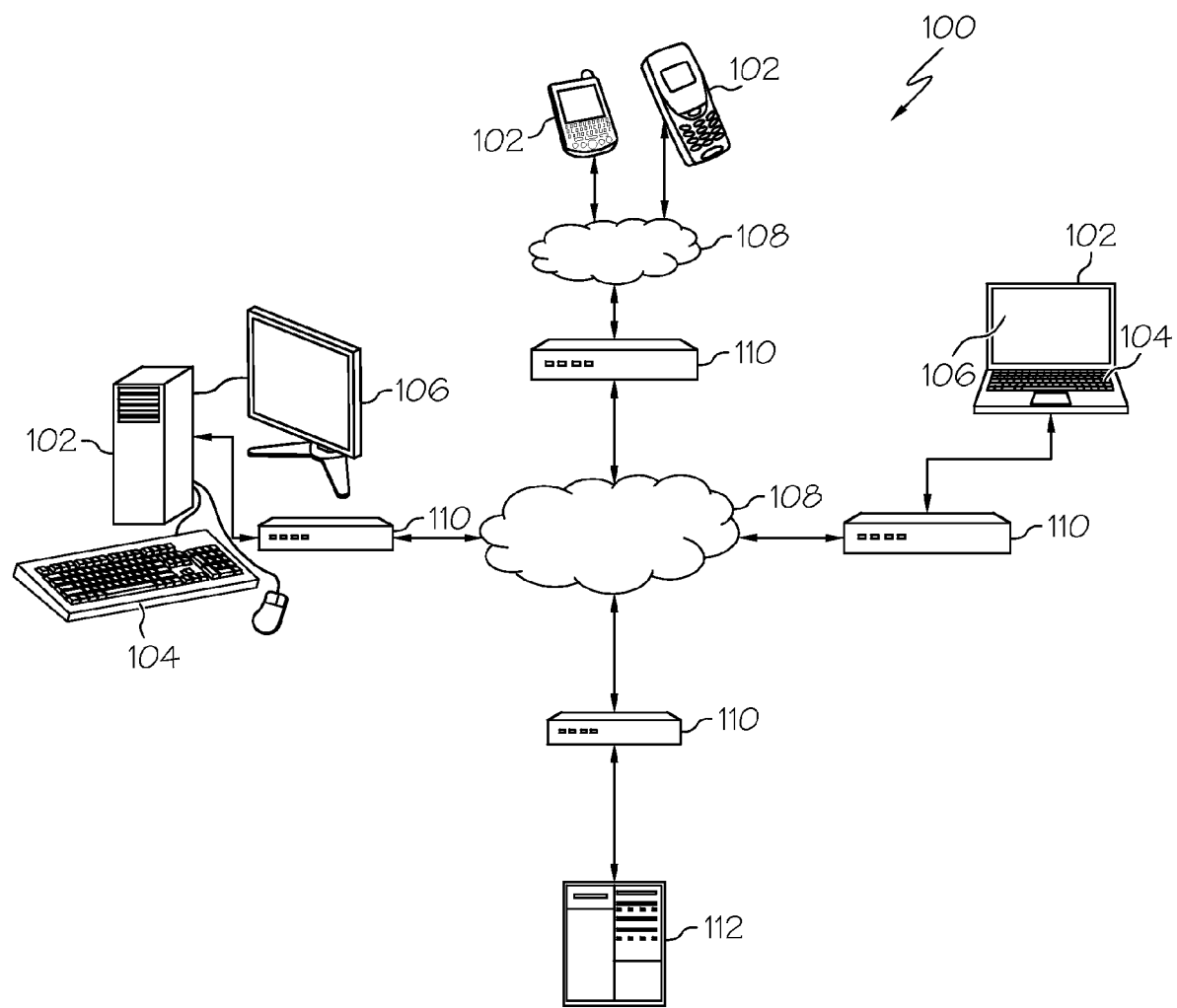
FIG. 1 is a block diagram illustrating an exemplary computer system, of which one or more components of the computer system are used to implement flows that convert an input of information in multiple languages to an output in a language that is common to, and different from, the multiple languages used to input the information, according to various aspects of the present invention.

Referring now to the drawings and particularly to FIG. 1, a general diagram of a computer system 100 is illustrated according to various aspects of the present invention. The computer system 100 comprises a plurality of processing devices, designated generally by the reference 102. Typical processing devices 102 include for example, personal computers, notebook computers, netbook computers, personal data assistant (PDA) processors, palm computers, cellular devices including cellular mobile telephones, and smart telephones. The processing devices 102 may also comprise servers, transactional systems, purpose-driven appliances, special purpose computing devices and/or other devices. Each processing device 102 includes an input device 104, such as a keyboard, keypad or other input, and an output device 106, such as a display device.

According to various aspects of the present invention, a mode supporting the input of information in multiple languages to produce an output in a target language, as described in greater detail herein, can be implemented by a process executed on a standalone processing device, e.g., one of the processing devices 102.

According to further aspects of the present invention, one or more processing device 102 may optionally communicate over a network 108. The network 108 provides communications links between the various processing devices 102, and may be supported by networking components 110 that interconnect the processing devices 102, including for example, routers, hubs, firewalls, network interfaces, wired or wireless communications links and corresponding interconnections, cellular stations and corresponding cellular conversion technologies, e.g., to convert between cellular and tcp/ip, etc. Moreover, the network 108 may comprise connections using one or more intranets, extranets, local area networks (LAN), wide area networks (WAN), wireless networks (WIFI), the Internet, including the world wide web, and/or other arrangements for enabling communication between the processing devices 102, in either real time or otherwise, e.g., via time shifting, batch processing, etc.

The illustrative system 100 also includes a server 112, e.g., a web server, file server, and/or other processing device that supports a processing engine for executing a website or other network-based application or service. In this regard, a mode supporting the input of information in multiple languages to produce an output in a target language, can be implemented as a process that is implemented on the server 112, which is accessed by a client such as a web browser executing on a processing device 102. Still further, a mode supporting the input of information in multiple languages to produce an output in a target language, can be implemented in a distributed manner, e.g., across a processing device 102 and the server 112 or across two or more processing devices 102. For instance, an implementation may attempt to execute entirely locally, e.g., on a select processing device 102. However, in the event that the local process cannot resolve the conversion of a string, the process may attempt to access an additional resource across the network 108, e.g., to access a larger lexicon, database or other functionality.

The system 100 is shown by way of illustration, and not by way of limitation, as a computing environment in which various aspects of the present invention may be practiced. Other configurations may alternatively be implemented.

Figure 2:
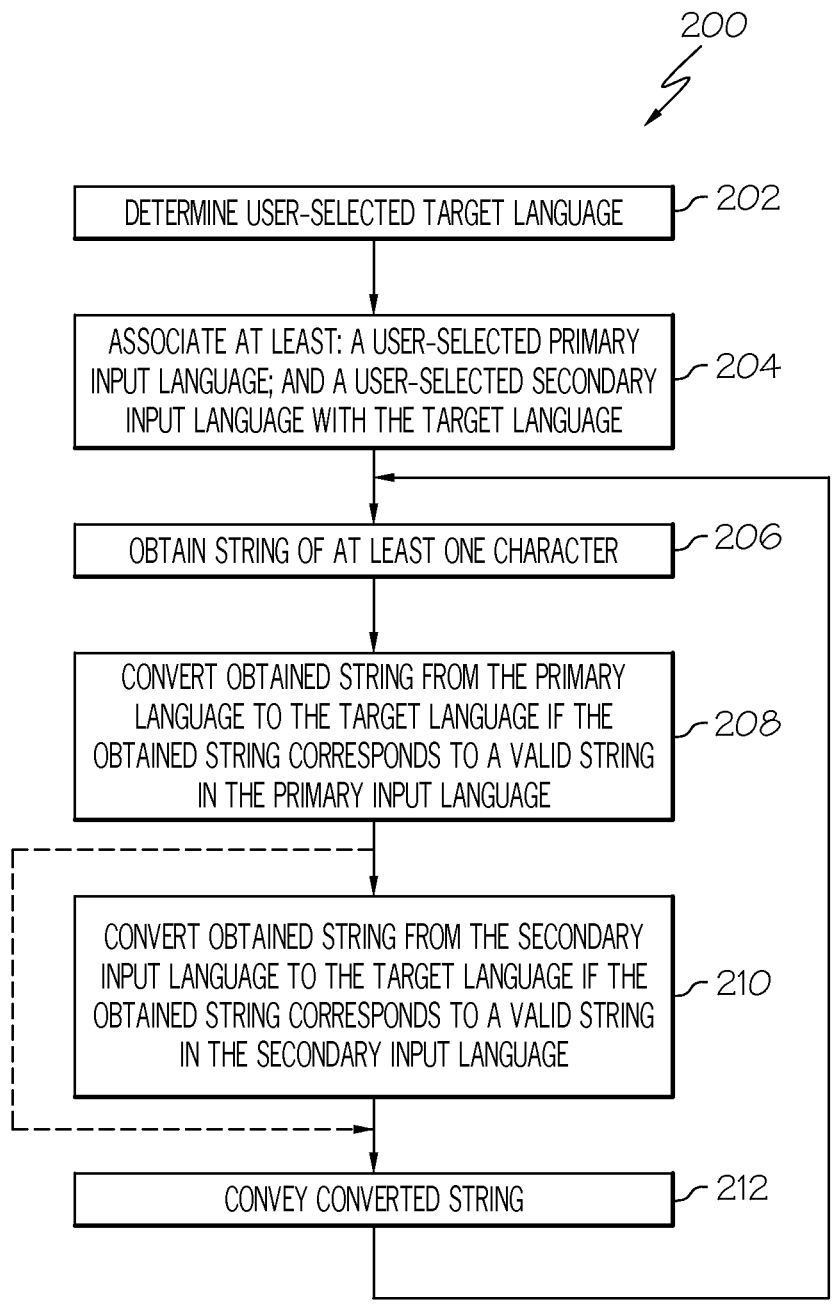
FIG. 2 is a flow chart illustrating a process for converting strings to a common language, according to various aspects of the present invention.

Referring to FIG. 2, a flow chart 200 illustrates a process for converting information entered into a computer in multiple languages to produce an output in a target language that is common to, and different from, the multiple languages used to input the information, according to various aspects of the present invention. The process illustrated in FIG. 2 may be implemented as a method or a process executed on a computer, e.g., by a processing device 102, server 112 or via other distributed arrangement of processing devices. The process illustrated in FIG. 2 may also describe a computer program product stored on a tangible storage medium such that when the computer code is read out of memory and is executed by a processor, the computer program instructions and corresponding computer implement the described process.

The process comprises determining at 202, a user-selected target language. The user-selected target language is the language that is to be conveyed, e.g., displayed on a monitor, output to a printer or otherwise communicated to an output device. As an illustrative example, the target language may be set by a user to Chinese so that information input into a corresponding computer is displayed using Chinese characters. The process further comprises associating at 204, a user-selected primary input language and at least one user-selected secondary input language with the target language. Keeping with the above example, a user may decide to utilize pinyin as the primary input language and English as the secondary input language. Thus, the user can use pinyin as the primary language for entering information. If the user does not know a word in pinyin, but does know the word in English, the user is free to simply type the word in English. Thus, according to various aspects of the present invention, the user is free to enter information, e.g., using a standard keyboard, by typing in either pinyin, English or otherwise. However, at least the strings entered in pinyin (the primary input language in this example) or English (a secondary input language in this example) will be converted to Chinese (the target language in this example).

The process attempts to execute a conversion by obtaining a string of at least one character at 206. At this point, the process does not know if the string is in pinyin, English or some other language. However, the attempted conversion process executes by converting the obtained string from the primary input language to the target language at 208, if the obtained string corresponds to a valid string in the primary input language. The conversion process may also execute by converting the obtained string from at least one secondary input language to the target language at 210 if the obtained string corresponds to a valid string in the corresponding secondary input language.

According to various aspects of the present invention, the process at 210 need only execute if the obtained string is not a valid string in the primary input language. Keeping with the above example of Chinese as the target language, pinyin as the primary input language and English as a secondary input language, a non-limiting, illustrative example is provided. In this example, the conversion process gives priority to the primary input language. Thus, if the input string is resolved as being a valid string in pinyin, no further conversion processing is required for that string by the process at 210.

According to further aspects of the present invention, the process at 210 converts the obtained string from at least one secondary input language to the target language if the obtained string corresponds to a valid string in the corresponding secondary input language independent of the results of the process at 208. That is, even if the input string is converted from the primary input language to the target language at 208, the process can still attempt to convert the input string from a secondary input language to the target language at 210. In this regard, if conversions are successful at both 208 and 210, the process selects the target language output based upon a priority between the primary input language and at least one secondary input language.

For instance, the primary input language may be set as a default to take priority over the secondary input language. Alternatively, the secondary input language conversion may take priority over the primary input language conversion. Still further, a priority may be based upon the user being presented with two or more conversion options, in which the user selects the desired output.

As an illustrative example, the obtained string may be converted from the primary input language of pinyin to the target language of Chinese by using a phonetic lexicon to attempt to interpret a correct Chinese character based upon an assumption that the input string is entered in pinyin. In this regard, pinyin provides a framework to interpret the obtained string into the target language of Chinese based upon a phonetic correspondence of the obtained string in the primary input language of pinyin.

Similarly, the obtained string may be converted from a second input language, e.g., English in the present example, to the target language of Chinese in the example. For instance, a translation is attempted by using a translation lexicon such as an electronic English to Chinese dictionary, based upon an assumption that the input string is entered in the secondary language of English.

The converted string may be conveyed at 212, e.g., by outputting the converted string in the target language. For instance, the converted string may be processed to replace the input string and the result can be displayed on a computer monitor. Alternatively, the converted string may be displayed on the monitor in a window that is separate from the display of the input string. As yet another illustrative example, the converted string may be conveyed to other output devices to facilitate usage by the user.

Upon converting the string, the process 200 may obtain and convert a new string as often as the user wishes to input information, as schematically illustrated by the feedback loop. Regardless of the number of strings converted by the process 200, the user is not required to switch input modes, e.g., the user is not required to adjust input language settings, press hotkeys or perform any reconfiguration of parameters to write in multiple languages. Thus, scenarios are avoided where the user inputs the wrong text by forgetting or failing to properly shift input language settings.

According to various aspects of the present invention, the process 200 can execute generally concurrently and/or interactively with the input of information by a user, e.g., reacting word by word or even letter by letter as the user types. For instance, the process may obtain a string that is at least one character long, which has been entered into a computer using a keyboard. In this regard, an iterative process may be performed, e.g., until the end of the string is reached or until the obtained string is converted to the target language.

As an illustrative example, the process may obtain a next keyboard entry modifying the string. This may be implemented in response to the user typing the next character of the string, backspacing or otherwise editing the string. In response to detecting a change to the string, the process attempts to convert the modified string from the primary input language to the target language and optionally, from a secondary input language to the target language. Thus, it is possible to convert the input string before the entire input string is entered by the user, e.g., by predicting the intended character in the target language based upon the partial input string or string fragment. If the conversion is successful, the process can obtain a new string and start the process over again.

As an example, in certain exemplary implementations, when converting the obtained string from the primary input language to the target language, the obtained string may be determined to be valid by detecting that a user has selected an interpretation from at least one option presented to the user, e.g., in a list, dialog box or other format, that represents a conversion from the primary input language to the target language, regardless of whether the string has been completely entered by the user.

As yet another illustrative example, the process may determine that the obtained input string is not (or not yet) a valid input string by detecting that a user has not selected an interpretation from a plurality of presented options, even though at least one presented option includes a literal match of the string for conversion to the target language. Thus, if a user recognizes that a wrong word has been entered, or that the interpretations do not match the intent that the user wants to convey, the user can choose not to select an interpretation from the primary input language to the target language.

As a few illustrative examples, the user may choose not to accept the option or options presented by an IME by selecting "none of the above" from a presented list of options if such an option is available, or by backspacing or otherwise entering keystrokes to change, modify or delete the input string. As still a further example, the user may choose not to accept the option or options presented by the IME by taking other appropriate actions. For instance, the user may turn off the IME.

Moreover, a user action, such as selecting "none of the above" where the option is available in the IME, turning off the IME, etc., can be treated as an intent of the user to interpret the string using a secondary input language. This gives users an option that they can choose to start a secondary input language translation manually.

If an attempted conversion is unsuccessful, the process can determine whether the string is complete. For instance, a string can be judged to be complete if the process detects a keystroke corresponding to the space bar, tab key, enter key, etc. If the string is judged to be incomplete, the iterative process continues, reacting to the next detected keystroke or keystrokes in a manner analogous to that described above. For example, the iterative process continues in response to detecting that the user further modified the string, e.g., by continuing to type out the next letter or letters of the desired string.

If the string is judged to be complete, e.g., by recognizing the spacebar, tab key, enter key, etc., and if the string has not been converted to the target language using the primary input language, then the process attempts to convert the input string using a translation from each user-identified secondary input language to the target language, in a manner analogous to that described above.

Thus, for example, each string may be represented by a word typed by the user, and each string may be separated based upon any desired delineation, e.g., the user pressing the space bar, tab key, enter key, etc., between words, etc. Moreover, conversion processing from the primary input language to the target language and optionally from a secondary language to the target language, may occur once an entire string is determined, or while the user is entering a given string. Thus, according to various aspects of the present invention, the productivity and efficiency of the user is increased as the user can freely select multiple input languages to input information that will be displayed in a target language. Moreover, according to further aspects of the present invention, a user can enter text into a computer using a standard keyboard, to obtain an output displayed in a target language, even where the user does not know how to input all of the type-written characters/words within that language using the keyboard, so long as the user knows how to enter the words using the keyboard in either the primary input language or at least one selected secondary input language.

Figure 3:
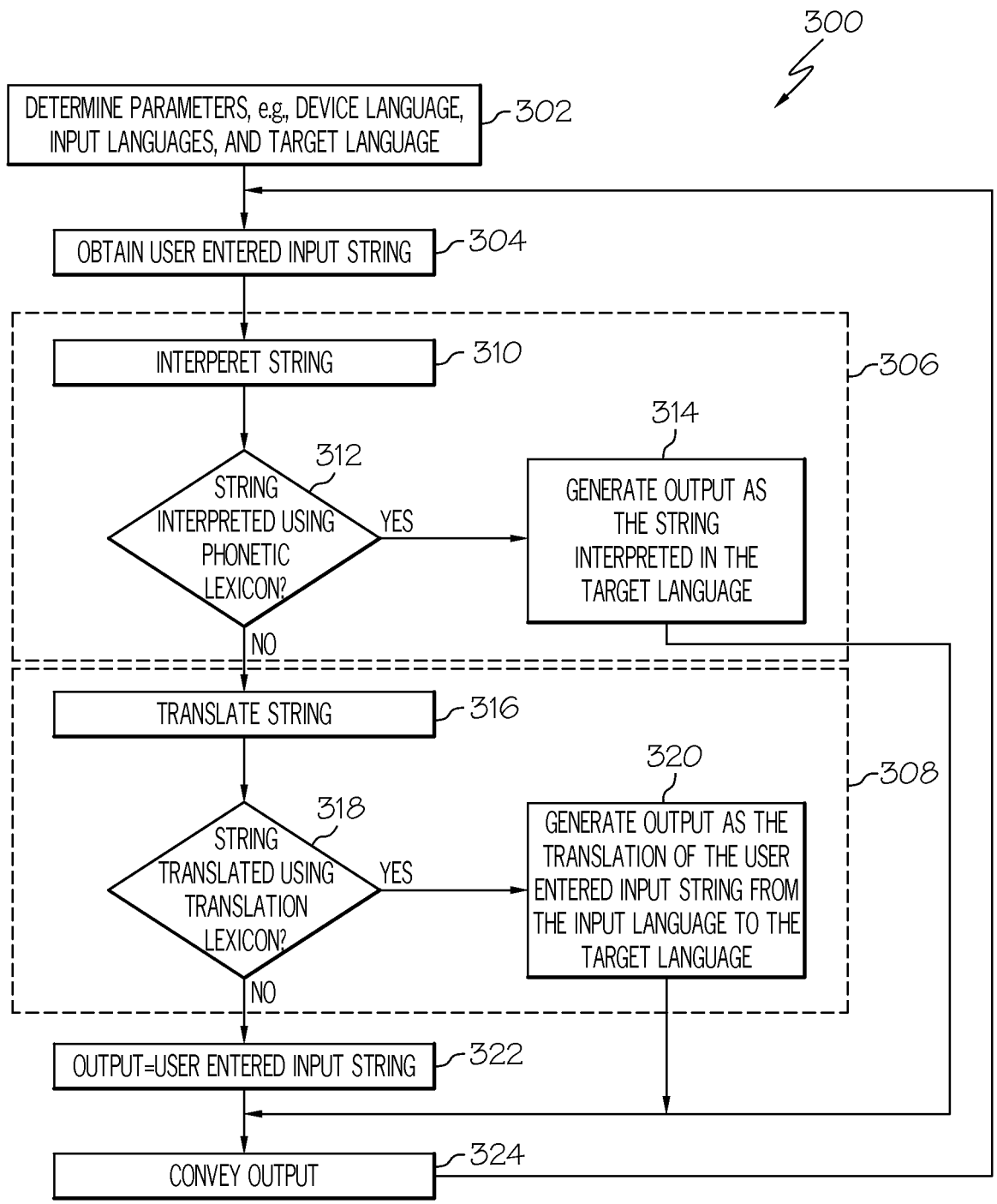
FIG. 3 is a flow chart illustrating a process for converting strings to a common language, according to various aspects of the present invention.

Referring to FIG. 3, a process 300 illustrates an overall flow of a mode to process input information in multiple languages to produce an output in a target language that is common to, and different from, the multiple languages used to input the information, according to various aspects of the present invention. The process illustrated in FIG. 3 may be implemented as a method or a process executed, e.g., by a processing device 102, server 112 or via other distributed arrangement. The process illustrated in FIG. 3 may also describe a computer program product stored on a tangible storage medium such that when the computer code is read out of memory and is executed by a processor, the computer program instructions are executed by the processing device to implement the described process.

The process includes determining the necessary parameters at 302 to implement a mode supporting multiple language input for entering text. For instance, the necessary parameters may comprise determining a user-selected device language and/or input languages and/or a target language.

In an illustrative example, the device language is a language/layout that is associated with the input device 104 used to enter information into the corresponding processing device 102. For example, in certain processing environments, the user can select the layout for the keyboard. For purposes of illustration, the user may select a device language of U.S. keyboard for a typical U.S. 104-key keyboard so that the layout and mapping of keys on the keyboard corresponds to the modern English version of the Latin alphabet. The device language associated with the input device is usually stored with the operating system executed on the corresponding processing device 102.

The input languages are the languages the associated user anticipates will be utilized for data entry. According to various aspects of the present invention, the user selects a primary input language, and at least one secondary input language. The target language is a language that is common to, and different from the primary input language and secondary input language(s). By way of illustration, the target language is conveyed to the user via an output device 106, e.g., a video monitor to display information representing the keystrokes entered by the user on the input device 104 in the target language.

As an illustrative example, assume that a user wants the target language to be Chinese, and wants to input information in multiple languages, including pinyin and English. In this regard, depending upon the computing environment and/or the manner in which parameters are entered, the user may only need to set two or three parameters.

For instance, assume that the user is working on a processing device 102 having an input device 104 implemented as a keyboard. The parameter for the device language, e.g., the keyboard language in this example, is likely already configured. For instance, the keyboard may be configured for a U.S. keyboard layout (e.g., modern English form of the Latin alphabet). Otherwise, the user may be required to set the parameter(s) for the desired keyboard language. Often, the keyboard language is set at the operating system level, and is thus typically not changed once the computer is set up, unless the keyboard layout is changed.

Additionally, the user sets the primary input language. For instance, if the user sets the primary input language to pinyin, the system may automatically understand that the target language is Chinese because pinyin is used to interpret Chinese characters using a conventional U.S. keyboard layout. Further, the user sets the secondary input language. In an illustrative example, the user selects English. However, this choice of secondary language is not limiting. Since the target language is Chinese, an English to Chinese machine translation service should be available, as described in greater detail herein. The user is free to select any secondary language(s) for which a machine translation service is available to translate from the secondary input language to the target language, as will also be described in greater detail herein.

As an illustrative example, in a conventional operating system where the keyboard language is already defined, a user may open a dialog box, e.g., at the operating system level, application level, or otherwise, e.g., on a client running on top of a word processor, IME, in a dialog box hosted on a web site, etc., and select a primary input language. The target language may be implied by the selected primary input language. Otherwise, the user may be required to also select the target language. The user also selects one or more secondary input languages.

Alternatively, according to various aspects of the present invention, a process may sit on top of a conventional IME, word processor, etc. In that regard, the parameters may be distributed. For example, the user may select the primary input language, e.g., at the operating system level used by an IME, and set the secondary language as a preference in a client or other light application.

The process obtains a user-entered input, e.g., a user-entered string at 304. The string can be obtained in any number of ways. For instance, by monitoring a text editor, IME, etc., one or more keystrokes can be considered a string, e.g., as distinguished or otherwise delineated by a designated "special" keystroke such as the space bar, tab key, enter key, etc. Thus, in this exemplary arrangement, as the user types, each time the space bar is pressed, a new string is defined. Moreover, the process can read the string as it is being created, e.g., keystroke by keystroke, or the process can wait until an input string has been formed. Where the string is read keystroke by keystroke, the process can re-evaluate one or more conversion processes, e.g., a conversion attempt from the primary input language to the target language and/or from at least one secondary input language to the target language, after each keystroke to attempt to better or more accurately convert the entered string. Other arrangements for obtaining the user string may alternatively be implemented.

Next, the process attempts to convert the string. As noted in greater detail herein, the input string may be in any one of multiple languages. As such, the process attempts to perform a conversion of the input string to the target language regardless of the input language.

In an illustrative implementation, the input languages, including the primary input language and one or more secondary input languages are associated with the target language utilizing one or more lexicons, each lexicon is selected to enable the conversion of entered keystrokes to an output in the corresponding target language. Keeping with the above example, for target languages such as Chinese, Japanese, Korean or other logographic languages, a phonetic lexicon may be utilized. For instance, a phonetic lexicon can provide the interpretation from keystrokes used to enter text in pinyin to corresponding Chinese characters. The phonetic lexicon is consulted to interpret keystrokes that are entered using English characters (e.g., based upon the keyboard language), but which set forth the phonetic pronunciation of a corresponding Chinese characters or symbols. In other words, the user is not typing English words, but rather, is using English characters to describe Chinese characters and symbols, e.g., phonetically.

A translation lexicon can be utilized to translate words in one language to their corresponding equivalent word or character in the target language. Keeping with the above example, a translation lexicon can be utilized to machine translate English to Chinese.

The process converts the obtained string from the primary input language to the target language at 306 if the obtained string corresponds to a valid string in the primary input language, and the process converts the obtained string from the secondary input language to the target language at 308 if the obtained string corresponds to a valid string in a secondary input language and is not a valid string in the primary input language.

Keeping with the example of setting the target language to Chinese, the primary input language to pinyin, and the secondary input language to English, the process performs or otherwise attempts to perform a phonetic process at 306 and the process may perform or otherwise attempt to perform a translation process at 308, e.g., depending upon the results of the phonetic process at 306.

In an exemplary implementation of a phonetic process at 306, an attempt to interpret the string is performed at 310, e.g., using a phonetic lexicon. A determination is made at 312 as to whether the received input string is interpreted as a valid string in the corresponding phonetic lexicon. If the string is properly interpreted, then the process generates an output at 314, representing the input string interpreted into the target language. If the input string cannot be properly interpreted, then the process tries at least one other conversion process, such as trying at least one translation process 308.

The translation process 308 attempts to translate the input string to the target language, e.g., using a translation lexicon, at 316. A determination is made at 318 as to whether the string was translated as a valid string in the corresponding translation lexicon. If the string is translated at 316, then the translation process generates an output at 320 representing the input string translated into the target language.

By way of illustration, assume the device language is defined at 302 for a conventional U.S. layout keyboard, the target language is defined as Chinese, the primary input language is pinyin and the secondary input language is English. Further, assume that the user enters the string "wo" on the keyboard. In Chinese, the sound "wo" is the character 我 in the target language, so the phonetic process 306 interprets the user-entered string "wo" as a valid string within corresponding phonetic lexicon and thus generates 我 as an output if this is the Chinese character intended by the user. Note that "wo" is not a valid English word. Rather, "wo" utilizes the English character set to represent a phonetic pronunciation (in Chinese) of a Chinese word.

Moreover, the phonetic process 306 can be interactive, e.g., re-interpreting the string letter by letter. For example, the phonetic process 306 may present multiple alternative suggestions that the user can select among so that the user can interact with the phonetic process 306 to select the most relevant interpretation. Thus, as soon as the user enters the letter "w", the phonetic process can present the user with options from the phonetic lexicon that start with the letter "w". When the user enters "o", the phonetic process 306 can update its list of user options, narrowed down to options containing the letter combination "wo". When the space bar, tab key, enter key, etc., is detected, an assumption is made that the string is complete. As such, if there are no alternatives in the phonetic lexicon corresponding to the string when the space bar, tab key, enter key, etc., is detected, or where a user indicates that no alternative matches their intent, the process ends.

For instance, keeping with the example used herein of selecting Chinese as the target language, pinyin as the primary input language and English as a secondary input language, assume that the user enters "Hollywood". Hollywood is not a valid pinyin word. As such, the phonetic process 306 interprets the user-entered string as not having a valid phonetic representation in Chinese. Thus, the phonetic process 306 terminates and the translation process 308 attempts to translate the string. More particularly, the translation process attempts to translate the string at 316 and determines at 318 if the string can be translated from the secondary input language into the target language, e.g., whether the string is within the translation lexicon. Keeping with the current example, if the secondary input language is English, the target language is Chinese and the user enters "Hollywood," then the translation process 308 translates "Hollywood" to 好莱坞.

According to various aspects of the present invention, if the string is not interpreted as being within the phonetic lexicon at 306, and the string cannot be translated from the secondary input language to the target language at 308, then the output may comprise the input string so as to "pass through" unmodified. That is, the string may not be changed or otherwise altered. Thus, a copy of the input string is generated as the output at 322. For instance, a reference such as ABC123 may not have either a valid interpretation in the phonetic lexicon of the phonetic process at 306 or a valid translation in the translation lexicon at the translation process at 308. As such, the generated output can be the string ABC123, itself.

In this regard, the output is not exclusively limited to words in the target language. Rather, the output can be a mix of the target language and the non-converted input strings. However, both the phonetic process 306 and the translation process 308 attempt to convert the input string to the same target language, e.g., via interpretation or translation respectively.

The above is only illustrative and exemplary. For instance, various aspects of the present invention may be implemented with a plurality of languages, e.g., using one or more phonetic lexicons and/or one or more machine translation lexicons.

The output of the process is conveyed at 324. The conveyance of the output may be implemented using several different techniques. For instance, the conveyance of the output may be by virtue of replacing the user's input string with the corresponding output string, e.g., the interpreted and/or translated information in the target language. Alternatively, the output can be directed to a different location than the input string, e.g., to preserve the user-entered input strings and to provide the output in the target language, e.g., by providing the target language data in separate display window, etc. Still further, the output can be conveyed to a printer or other output device.

Although illustrated for purposes of illustration as implementing the phonetic process 306 before the translation process 308, the invention is not so limited. For instance, in certain applications, it may be acceptable to attempt to translate before using a phonetic process. Alternatively, two or more conversion processes may be implemented substantially concomitantly, e.g., a phonetic process and a translation process may be implemented in parallel, as compared to serially. For instance, the phonetic process 306 and the translation process 308 can each attempt a conversion as a string is entered by a user, e.g., letter by letter. In this regard, the user may have the choice of which option to select.

Moreover, the translation can occur from any source language to the target language. As a first illustrative example, the keyboard device language could be set to a U.S. keyboard layout, thus enabling the input of information using a US character set. The target language can be set to Chinese, the primary input language may be set to pinyin, and a secondary input language may be set to English. In this instance, typing "wo" would be interpreted as the Chinese character 我 by the phonetic process at 306. However, assume that the user does not know the pinyin spelling for a greeting. Further, assume that the user does know the spelling in English. In this example, the user enters an input such as "hello". The string "hello" is a literal word in the pinyin language that is interpreted by the phonetic process 306 as 荷兰略. The user however, recognizes these Chinese characters as a clearly erroneous reference to the Netherlands. However, the translation process at 308 recognizes the string "hello" as a proper English word and machine translates hello to the Chinese characters 您好.

As noted in the above example, depending upon the implementation, it is possible that an obtained input string can be valid in multiple conversion processes, e.g., the obtained string can find a literal match in both processes 208 and 210 in FIG. 2, for example. Thus, in FIG. 3, the flow can be modified to not bypass the translation process 308 if the string is interpreted as being in the phonetic lexicon such that both the phonetic process 306 and the translation process 308 are both performed. Under this configuration, it is possible for a string to be valid in both a phonetic lexicon and a translation lexicon at 306 and 308 respectively.

If the user-entered string is valid as being within both the phonetic lexicon and the translation lexicon, a priority can be either predefined or user-selected in a manner analogous to that described more fully herein. For instance, the phonetic process 306 may be given priority, the translation process may be given priority, or the user may be presented an option to select the output from either the phonetic lexicon or the translation lexicon. However, other configurations may alternatively be implemented.

As also noted in greater detail herein, a secondary input language may be set to language other than English. As a further illustrative example, assume that the secondary input language is changed from English to Spanish. Keeping with the above example, if the user entered the string "hello", and does not intend to reference the Netherlands, the obtained input string should be considered invalid by the phonetic process at 306. However, now the translation process at 308 should also consider the string invalid because the string "hello" is not a valid string in the Spanish to Chinese lexicon. Thus, the process may simply allow the word to pass through unconverted.

If the input string is now changed to "hola", the phonetic process 306 does not find a match in the corresponding phonetic lexicon, so the input string is determined to be invalid. However, now the translation process at 308 translates "hola" to 您好 because the input string is in the Spanish to Chinese lexicon.

As an example of writing a complete sentence, assume that a user wishes to enter "I like Hollywood movies" through a standard U.S. 104-key keyboard to a text editor so that the display is in Chinese. The user sets up the primary input language to pinyin, thus also setting the target language to Chinese. The user also sets English as a secondary input language. These exemplary parameters are utilized to associate a pinyin-to-Chinese phonetic lexicon and an English-to-Chinese translation lexicon. The user enters "wo xihuan Hollywood dianying". In this manner, the user has commingled pinyin and English in a single sentence, without pressing any hotkeys or other entering any other keystrokes to identify a change in the input language.

In this implementation, every time a space is entered, the process recognizes the end of the corresponding string. By way of illustration, After the first space separating "wo" from "xihuan", the obtained input string at 304 is "wo". As such, the phonetic process 306 looks up "wo" in the phonetic lexicon at 310 and determines that a match exists at 312 interpreting "wo" to the corresponding character 我. As such, the string "wo" is converted to the corresponding string 我. This is the character intended by the user.

After the second space separating "xihuan" from "Hollywood", the obtained input string at 304 is "xihuan". As such, the phonetic process 306 looks up "xihuan" in the phonetic lexicon at 310 and determines at 312 that a match exists interpreting "xihuan" to the corresponding characters 喜欢. This is the character string intended by the user. As such, the string "xihuan" is converted to the corresponding string 喜欢, and the output now includes 我喜欢.

After the third space separating "Hollywood" from "dianying", the obtained input string at 304 is "Hollywood". As such, the phonetic process 306 looks up "Hollywood" in the phonetic lexicon at 310 and determines at 312 that no match exists. As such, the translation process 308 attempts a machine translation at 316. At 318, a determination is made that "Hollywood" has been successfully translated to 好莱坞, thus the string "Hollywood" is converted to the corresponding string 好莱坞. The output now includes 我喜欢好莱坞.

After the fourth space, the obtained input string at 304 is "dianying". As such, the phonetic process at 306 looks up "dianying" in the phonetic lexicon at 310 and determines at 312 that "dianying" is interpreted as the characters 电影. This is the character string intended by the user. As such, at the completion of the conversion, the sentence "wo xihuan Hollywood dianying." is converted to the common target language of Chinese and the text editor displays the entire sentence 我喜欢好莱坞电影.

Various aspects of the present invention may be integrated with or otherwise executed as part of an IME. Alternatively, various aspects of the present invention may be executed outside of or otherwise in cooperation with an IME, e.g., as a separate application such as, but not limited to, a thin client running on top of an IME or an application that implements an equivalent function.

The lexicons may be part of the IME or separate from the IME residing locally or remotely. The lexicons also do not need to be contiguous, e.g., the phonetic lexicon may reside locally and/or at one or more remote locations, e.g., across an intranet, network, the Internet, etc.

Figure 4:
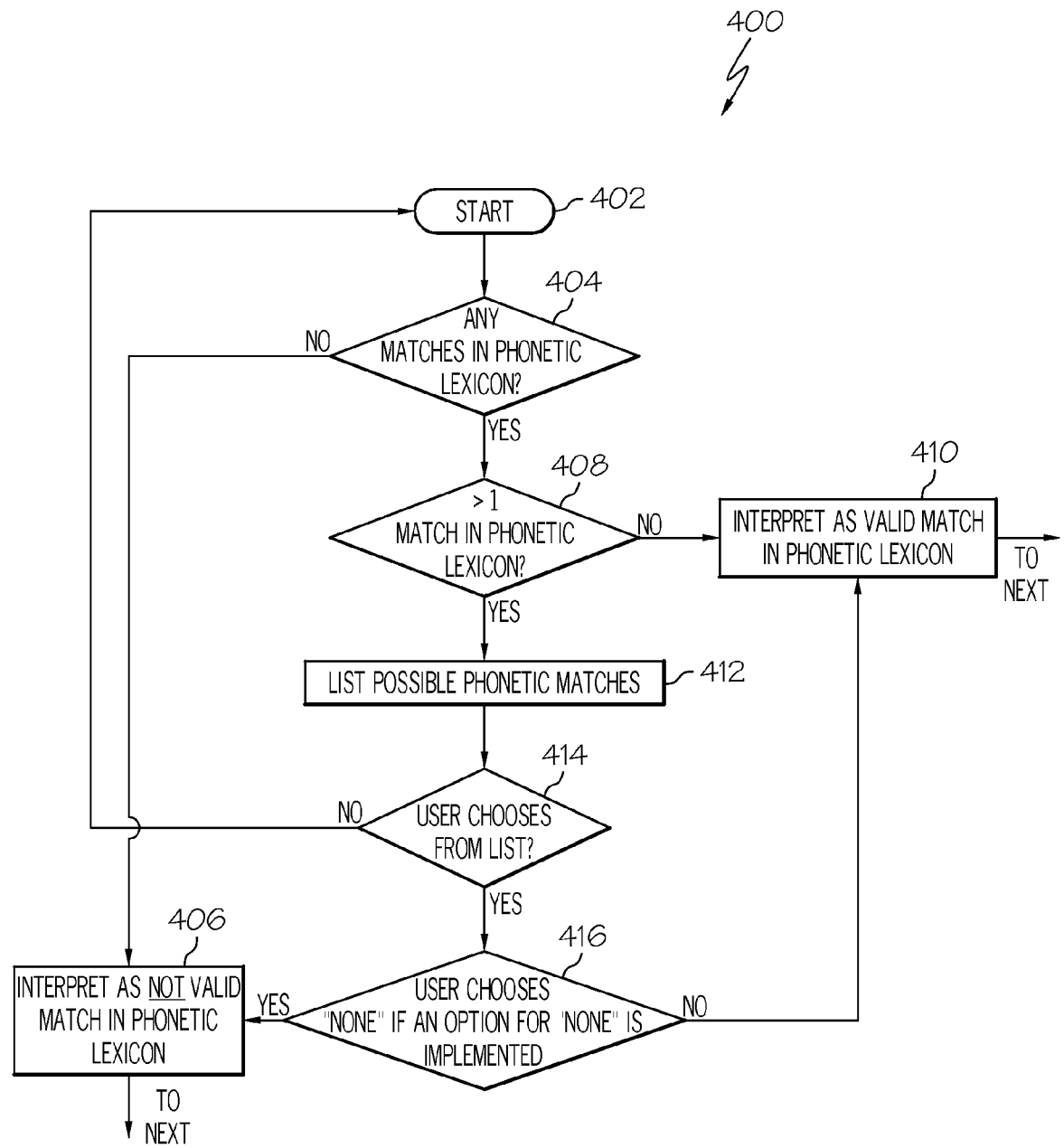
FIG. 4 is a flow chart illustrating a phonetic process utilized for converting strings to a common language, according to various aspects of the present invention.

With reference to FIG. 4, an exemplary phonetic process 400 is illustrated according to various aspects of the present invention. The phonetic process 400 may be utilized, e.g., to implement the phonetic process 306 described with reference to FIG. 3. There are many approaches to trigger the start at 402 of the phonetic process 400. For instance, the phonetic process 400 may be started at 402 upon detecting that a space has been entered by the user, or by detecting some other indication of the completion of the string. Alternatively, the phonetic process 400 may be started at 402 whenever the user enters any key or otherwise deliberately presses a key or provides a suitable input. As yet another illustrative example, if the translation process 308 is performed first, then a failure of a valid translation may trigger the phonetic process 400.

Once started, the phonetic process 400 determines at 404, whether the user-entered string has any matches within the phonetic lexicon. This may be accomplished, for example, by evaluating the string to see if a match exists in an appropriate phonetic lexicon, or the phonetic process 400 may submit the string to another process or service, e.g., a local or remote service for purposes of attempting to match the string to at least one entry in the phonetic lexicon.

If there is no match, then the phonetic process 400 interprets the user-entered string as not within the phonetic lexicon at 406 and the process terminates, e.g., the process proceeds to a next step such as a translation process. If there is a match at 404, the phonetic process determines at 408 if there is more than one match between the user-entered string and the strings in the phonetic lexicon.

If there is only one match, the phonetic process interprets the user-entered string as within the phonetic lexicon at 410 and proceeds to generate a converted string in the target language. Alternatively, the process could require the user to confirm the selection, even if a single match is located. However, if the user-entered string matches more than one string in the phonetic lexicon at 408, then the phonetic process generates and displays a reasonably sized list of possibilities at 412 from which the user may choose a desired output. A determination is made at 414 as to whether the user has made a selection from the list.

If the user fails to make a selection of any kind at 414, and the space bar, tab key, enter key, etc., has not been detected, the user may not be finished inputting characters. As such, the flow can loop back to the start at 402 to read another character and process the new instance of the string.

If it is determined that the user has chosen from the list at 414, an optional determination may be made at 416 as to whether the user chose "none" e.g., where the specific implementation provides for a selection for none of the above, thus designating that no interpretation fits the intent of the user. Still further, the user may select an interpretation from the options listed.

If the user chooses an interpretation, then the flow loops back to 410 and the string is interpreted as valid within the phonetic lexicon. However, if the user chooses "none" in those implementations where such an option is provided, then the phonetic process interprets the user-entered string as not within the phonetic lexicon even though the lexicon includes valid matches for the literal user-entered string. Thus, the process feeds back to 406 where the string is interpreted as not being a valid match in the phonetic lexicon. The process may then proceed, for example, to the translation process.

For example, assume that the primary input language is pinyin, thus designating the target language as Chinese. The user enters "d", and the phonetic process determines at 404 that matches exist and further determines at 408 that there are several matches to "d" within the phonetic lexicon, e.g., 的, 到, 大, 地, 都, etc. The phonetic process generates a full or partial list, e.g., the phonetic process may select only the first four possibilities 的, 到, 大, 地 at 412. The user may choose from those four possibilities, none of the above if such an option is available, or to continue entering characters. Assume for this example, that the user fails to select an option and continues the string by entering "i". Now, the string is expanded to "di". The phonetic process determines at 404 that matches exist and further determines at 408 that there are several matches to "di" within the phonetic lexicon. The process thus generates a new list 地, 第, 底, 抵 at 412.

This process continues until the user makes a selection or only one option is left. When the user enters a complete string, e.g., assume the user enters the string "dianying", the phonetic process has one match only and interprets the user-entered string at 410 as within the phonetic lexicon and generates the converted string 电影. If instead, the user enters "diany" and chooses "none" from the list, e.g., where an option for "none" is provided, then the phonetic process interprets at 406 that the user-entered string as not within the phonetic lexicon and the process proceeds to the translation process.

As yet another illustrative example, if the user enters "dian" and 电影 is presented as an option at 412, the user may select this option without having to fully type the pinyin word "dianying".

In certain illustrative implementations, the phonetic process may always generate a list of possibilities, even if only one match is found. For instance, a choice for "none" may optionally be added to the list of one match to allow the user to override any match found. In other illustrative examples, the list generated at 412 may not include an option for "none" and the phonetic process continues until the user-entered string has only one match in the phonetic lexicon or the user modifies or deletes the string, e.g., by pressing the backspace key to erase the string, etc. In this regard, a user can still manually trigger a translation from a secondary input language, such as by turning off a corresponding IME.

Figure 5:
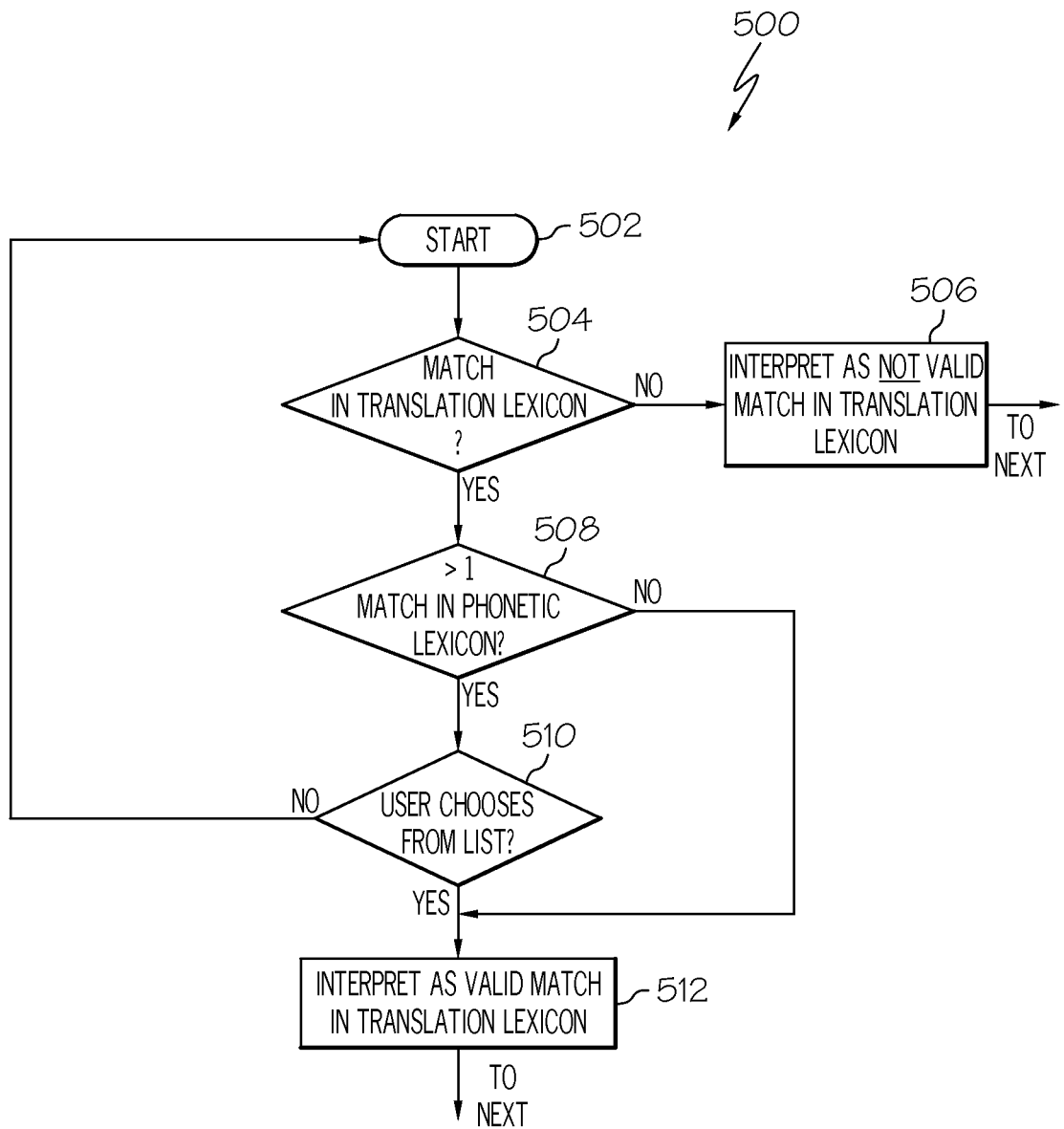
FIG. 5 is a flow chart illustrating a translation process utilized for converting strings to a common language, according to various aspects of the present invention.

Referring to FIG. 5, an exemplary translation process 500 is illustrated. The translation process 500 may be utilized, e.g., to implement the translation process 308 described with reference to FIG. 3. The process starts at 502, e.g., in response to a corresponding phonetic process not interpreting an input string. Alternatively, the translation process 500 may start upon detecting an input string (such as a keystroke, an entry such as the space bar, tab key, the enter key, etc.) for evaluation. As yet another illustrative example, a software client may sit on top of a conventional IME. If the IME does not interpret a string, the client may trigger to read the string and attempt a machine translation.

The translation process 500 determines at 504 if the user-entered string has one or more matches in the translation lexicon. This may be accomplished, for example, by evaluating the string to see if a match exists in an appropriate translation lexicon, or the translation process 500 may submit the string to another process or service, e.g., a local or remote service for purposes of attempting to match the string to at least one entry in the translation lexicon.

If there is no match in the translation lexicon, then the translation process interprets the string as not within the translation lexicon at 506 and the process 500 terminates. Thus, an overall flow may proceed to a next step. However, if there is a at least one match, the translation process determines at 508 if there is one match or more than one match. If there is more than one match, then the translation process determines at 510 whether a user has selected one of the returned matches. If the user does not select one of the returned matches at 510, the process can loop back to allow the user to make the user-entered string longer or otherwise make changes to the string. However if there is only one match at 508, or if the user makes a selection at 510, then the translation process considers the string a valid translation within the translation lexicon at 512 and the process terminates. Thus, an overall flow may proceed to a next step.

As noted in greater detail here, various aspects of the present invention may be implemented using a thin client. The thin client can run on top of existing IME software. In general, the thin client can identify the preference settings at least for the secondary input language(s). For instance, as noted in greater detail herein, the language input can be set through the thin client, through the operating system, through a text editor, through an IME application, or a combination of any two or more of the above. Overall, this alternative solution does not require any code modification in the IME software. This allows a conventional IME to be "enhanced" to extend functionality, potentially without code changes to the IME. In this regard, the IME may not even be aware that it is being enhanced with machine translation capability, making the thin client deployable into existing systems with minimal modification.

The thin client may detect the languages that are being processed through the IME in a text editor. The thin client triggers a built-in or a 3rd party machine translation tool to translate an entered string from at least one secondary language to the target language, e.g., where the thin client detects that the IME failed to interpret a string.

Figure 6:
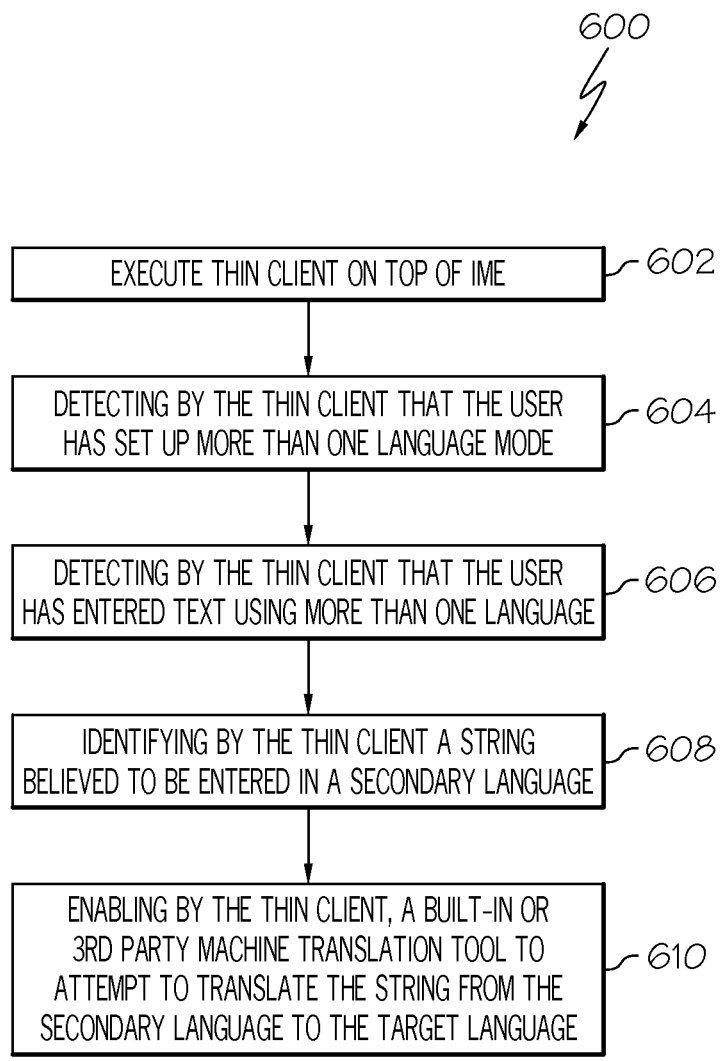
FIG. 6 is a flow chart illustrating a thin client executing in cooperation with an input method editor, according to various aspects of the present invention.

Referring to FIG. 6, in an illustrative arrangement, a thin client is run on top of an IME, e.g., regardless of whether the IME is executing at the operating system level or as a third party application at 602.

The thin client detects that the user has set up more than one language mode at 604. For instance, the thin client can determine a user-selected target language and associate at least one user-selected secondary input language with the target language. As described more fully herein, the settings can be set at the operating system level, the IME level, an application level, thin client level or combination thereof. Also as noted in greater detail herein, one language mode can be set as the default and the remainder of language mode(s) serve as secondary language mode(s).

If more than one input language is selected, the thin client can monitor a text editor, IME or other source of information entry. If the thin client detects that more than one language is used to input information at 606, e.g., in the same sentence or context, then the thin client identifies a string believed to be in a secondary language at 608. The thin client further enables at least one translation of a string believed to be in a secondary language at 610. For instance, the thin client can detect that the IME has failed to interpret a string passed to the input IME. As such, the thin client can utilize, enable, instruct, invoke or otherwise cause at least one translation attempt of the string from a secondary language to the target language. The translation is implemented by a machine translation process, but may be local, e.g., built into the process, or the translation may be implemented by a third party translation process, e.g., also hosted on the same processing device or hosted on a different processing device accessible over a network connection.

Figure 7:
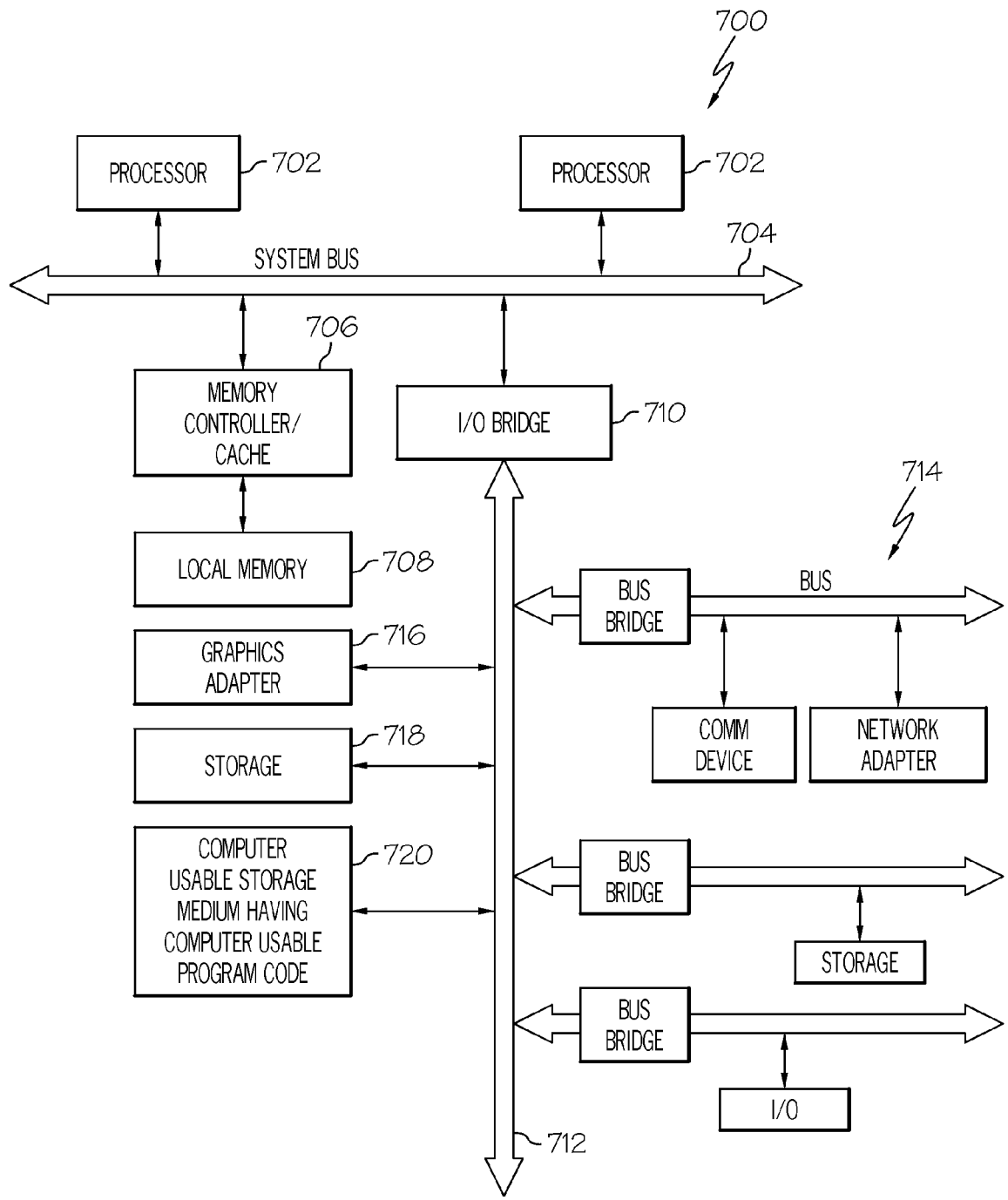
FIG. 7 is a block diagram of a computer system having a computer readable storage medium for implementing flows that convert an input of information in multiple languages to an output in a language that is common to, and different from, the multiple languages used to input the information, according to various aspects of the present invention.

Referring to FIG. 7, a block diagram of a data processing system is depicted in accordance with various aspects of the present invention. Data processing system 700, such as the server described with reference to FIG. 1, may comprise a symmetric multiprocessor (SMP) system or other configuration including a plurality of processors 702 connected to system bus 704. Alternatively, a single processor 702 may be employed. Also connected to system bus 704 is memory controller/cache 706, which provides an interface to local memory 708. An I/O bus bridge 710 is connected to the system bus 704 and provides an interface to an I/O bus 712. The I/O bus may be utilized to support one or more buses and corresponding devices 714, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 716, storage 618 and a computer usable storage medium 720 having computer usable program code embodied thereon. The computer usable program code may be executed e.g., by the processor 702, to implement any aspect of the present invention, for example, to implement any aspect of any of the methods and/or system components illustrated in FIGS. 1-6. Moreover, the computer usable program code may be utilized to implement any other processes that are used to perform conversion from a user-entered string to a interpreted string, translated string, or unmodified string, as set out further herein.

The data processing system depicted in FIG. 7 may comprise, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon, e.g., providing program code for use by or in connection with a computer or any instruction execution system.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any structure, material, or act for performing the function in combination with other claimed elements as specifically claimed. The description of various aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of converting strings to a common language comprising:
   determining a user-selected target language;
   associating a user-selected primary input language and at least one user-selected secondary input language with the target language, wherein the target language is common to, and different from, the primary input language and the at least one secondary input language;
   obtaining a string of at least one character;
   converting the obtained string from the primary input language to the target language if the obtained string corresponds to a valid string in the primary input language by using a phonetic lexicon to interpret the obtained string in the target language based upon a phonetic correspondence of the obtained string in the primary input language;
   converting the obtained string from at least one secondary input language to the target language if the obtained string corresponds to a valid string in the corresponding secondary input language and is not a valid string in the primary input language by using a translation lexicon to translate the obtained string from the secondary language to the target language; and
   outputting the converted string in the target language to an output device.

2. The method according to claim 1, wherein:
   obtaining a string comprises obtaining at least one character entered into a computer using a keyboard;
   further comprising:
   performing an iterative process if the obtained string is not converted from the primary input language to the target language by:
      obtaining a next keyboard entry modifying the string;
      attempting to convert the modified string from the primary input language to the target language;
      determining if the string is complete; and
      ending the iterative process if the modified string is determined to be complete.

3. The method according to claim 2, wherein determining if the string is complete comprises detecting a keystroke corresponding to at least one of the spacebar, tab key and enter key.

4. The method according to claim 1, wherein:
converting the obtained string from the primary input language to the target language if the obtained string corresponds to a valid string in the primary input language, further comprises:
- determining that the string is valid by detecting that a user has selected an interpretation from a plurality of options presented to the user that each represent a conversion from the primary input language to the target language; and
- determining that the string is invalid by detecting that a user has not selected an interpretation from at least one presented option, even though at least one presented option includes a literal match of the string for conversion from the primary input language to the target language.

5. The method according to claim 1, further comprising:
a phonetic lexicon associated with the conversion from the primary input language to the target language; and
a translation lexicon associated with the conversion from the secondary language to the target language; wherein:
converting the obtained string from the primary input language to the target language comprises using the phonetic lexicon to interpret the obtained string in the target language based upon a phonetic correspondence of the obtained string in the primary input language; and
converting the obtained string from the second input language to the target language comprises using the translation lexicon to translate the obtained string from the secondary language to the target language.

6. The method according to claim 1, wherein:
outputting the converted string in the target language comprises conveying the converted string by replacing the obtained string with the converted string.

7. The method according to claim 1, wherein:
outputting the converted string in the target language comprises outputting the converted string to a display device separate and distinct from the obtained string.

8. The method according to claim 1, further comprising:
converting the obtained string from at least one secondary input language to the target language if the obtained string corresponds to a valid string in the corresponding secondary input language regardless of whether the obtained string is also a valid string in the primary input language; and
selecting the output based upon a user-determined priority between the primary input language and at least one secondary input language.

9. A computer program product to convert strings to a common language comprising:
a computer readable storage medium having computer readable program code embodied therewith, the computer readable program code comprising:
computer readable program code configured to determine a user-selected target language;
computer readable program code configured to associate a user-selected primary input language and at least one user-selected secondary input language with the target language;
computer readable program code configured to obtain a string of at least one character;
computer readable program code configured to convert the obtained string from the primary input language to the target language if the obtained string corresponds to a valid string in the primary input language by using a phonetic lexicon to interpret the obtained string in the target language based upon a phonetic correspondence of the obtained string in the primary input language;
computer readable program code configured to convert the obtained string from at least one secondary input language to the target language if the obtained string corresponds to a valid string in the associated secondary input language and is not a valid string in the primary input language, by using a translation lexicon to translate the obtained string from the secondary language to the target language; and
computer readable program code configured to output the converted string in the target language to an output device.

10. The computer readable storage device according to claim 9, wherein:
obtaining a string comprises obtaining at least one character entered into a computer using a keyboard;
wherein the program further instructs the processor to perform:
performing an iterative process if the obtained string is not converted from the primary input language to the target language by:
- obtaining a next keyboard entry modifying the string;
- attempting to convert the modified string from the primary input language to the target language;
- determining if the string is complete; and
- ending the iterative process if the modified string is determined to be complete.

11. The computer readable storage device according to claim 10, wherein determining if the string is complete comprises detecting a keystroke corresponding to at least one of the spacebar, tab key and enter key.

12. The computer readable storage device according to claim 9, wherein:
converting the obtained string from the primary input language to the target language if the obtained string corresponds to a valid string in the primary input language, further comprises:
- determining that the string is valid by detecting that a user has selected an interpretation from a plurality of options presented to the user that each represent a conversion from the primary input language to the target language; and
- determining that the string is invalid by detecting that a user has not selected an interpretation from at least one presented option, even though the at least one presented option includes a literal match of the string for conversion from the primary input language to the target language.

13. The computer readable storage device according to claim 9, wherein the program further instructs the processor to perform:
converting the obtained string from the primary input language to the target language comprises using a phonetic lexicon associated with the conversion from the primary input language to the target language to interpret the obtained string in the target language based upon a phonetic correspondence of the obtained string in the primary input language; and
converting the obtained string from at least one second input language to the target language comprises using a translation lexicon associated with the conversion from the secondary language to the target language to translate the obtained string from the secondary language to the target language.

14. The computer readable storage device according to claim 9, wherein:
   outputting the converted string in the target language comprises conveying the converted string by replacing the obtained string with the converted string.

15. The computer readable storage device according to claim 9, wherein:
   outputting the converted string in the target language comprises outputting the converted string to a display device separate and distinct from the obtained string.

16. The computer readable storage device according to claim 9, wherein the program further instructs the processor to perform:
   converting the obtained string from at least one secondary input language to the target language if the obtained string corresponds to a valid string in the corresponding secondary input language regardless of whether the obtained string is also a valid string in the primary input language; and
   selecting the output based upon a user-determined priority between the primary input language and at least one secondary input language.

17. A method of converting strings to a common language comprising:
   executing a thin client on top of an input method editor;
   detecting by the thin client that the user has set up more than one language mode;
   determining a user-selected target language;
   associating a user-selected primary input and at least one user-selected secondary input language with the target language;
   detecting by the thin client that the user has entered text using more than one language;
   identifying by the thin client, a string believed to be in a secondary language;
   enabling by the thin client, a machine translation attempt of the string to translate the string from the secondary language to the target language, by using a phonetic lexicon to interpret a obtained string in the target language based upon a phonetic correspondence of an obtained string in the primary input language and a translation lexicon to translate an obtained string from the secondary language to the target language.

18. The method according to claim 17, wherein detecting by the thin client that the user has entered text using more than one language comprises:
   detecting by the thin client that the input method editor has failed to interpret a string passed to the input method editor.

19. The method according to claim 17, wherein enabling by the thin client, a machine translation attempt comprises:
   invoking a third party machine translation to attempt to translate the string from the secondary language to the target language.

\* \* \* \* \*